3,842,098
PRODUCTION OF 2-MERCAPTOBENZIMIDAZOLE BY REACTING o-PHENYLENE DIAMINE AND CARBON DISULFIDE

Bernd Scherhag, Eliahu Koppelmann, and Hermann Wolz, Leverkusen, and Marc Francque, Monheim, Rhineland, Germany, assignors to Bayer Aktiengesellschaft, Leverkusen, Germany
No Drawing. Filed Jan. 12, 1973, Ser. No. 323,118
Claims priority, application Germany, Jan. 18, 1972, P 22 02 204.4
Int. Cl. C07d 49/38
U.S. Cl. 260—309.2    5 Claims

ABSTRACT OF THE DISCLOSURE

Process for the production of 2-mercaptobenzimidazole in high yields having a high purity in which the reaction is carried out in a solvent which contains all the starting materials and the reaction products in homogeneous solution during the reaction, the 2-mercaptobenzimidazole formed is extracted from the solution with aqueous alkali metal hydroxide solution and precipitated therefrom by the addition of a mineral acid.

---

This invention relates to a process for the production of high purity, colourless 2-mercaptobenzimidazole in high yields and large volume-time yields.

It is known that 2-mercaptobenzimidazole can be obtained from the reaction of o-phenylene diamine with carbon disulphide in accordance with the following reaction equation:

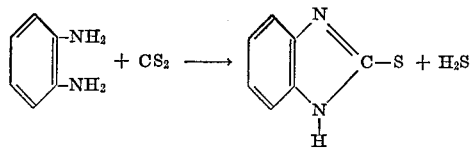

This reaction is accelerated by the addition of catalytic quantities of tertiary amines or alkali metal hydroxides. However, the reaction cannot be carried out in the solid phase on account of the high melting point of 2-mercaptobenzimidazole of above 300° C. Water, alcohol or even an aromatic hydrocarbon have been proposed as solvents for o-phenylene diamine. On account of its insolubility in practically every solvent, 2-mercaptobenzimidazole is precipitated during the reaction in the form of a crystalline deposit. In addition to the o-phenylene diamine itself, the crystals which precipitate also contain impurities of this diamine formed through autoxidation because they have a greater dissolving power on these substances than the reaction medium. This applies in particular as regards the products of secondary reactions which can be formed in accordance with the following scheme for example through the bifunctionality of the reactants:

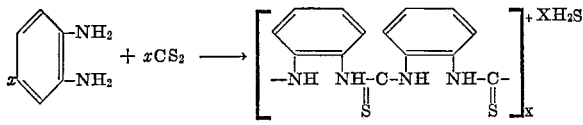

Therefore, these and other impurities with their high solubility in 2-mercaptobenzimidazole are present in more or less large quantities in the precipitating crystals with the result that the reaction product itself is coloured and generally undergoes further discolouration on standing in air. High-purity o-phenylene diamine free from isomer and autoxidation products has to be used as starting material, and the process has to be controlled in such a way that polymeric secondary products of the kind referred to are not formed, in order to produce a colourless product which does not discolour in air.

Whereas the requirement for isomer-free o-phenylene diamine can be satisfied through expensive purification measures in the case of production from o-nitraniline for example, it remains difficult to prevent autoxidation of the o-phenylene diamine isolated. In practice, therefore, processes have been developed for the production of 2-mercaptobenzimidazole which only produce the o-phenylene diamine from o-nitraniline when it is actually required. DAS No. 1,162,377, for example describes a process in which o-nitraniline is reduced in aqueous suspension with sodium sulphide or sodium sulphydrate to form o-phenylene diamine and subsequently reacted with carbon disulphide in the heavily reducing and strongly alkaline aqueous phase. Under suitable conditions, both stages of the reaction can be carried out continuously in a single stage.

Suppression of the autoxidation of free o-phenylene diamine made possible in this way results in a reduction in the reaction velocity because the carbon disulphide, as a water-insoluble substance, can only react by way of the trithiocarbonate stage. This in turn necessitates the use of an adequate excess of alkali in the reaction vessel so that, after the 2-mercaptobenzimidazole has been formed, it is present in part as a dissolved alkali salt. The substance can then be precipitated by the addition of mineral acid. However, since sodium thiosulphate is formed in the reaction mixture from sodium sulphide or sodium sulphydrate, for example, through the previous reduction of the o-nitraniline, the sodium thiosulphate decomposes on acidification while liberating sulphur which is co-precipitated and included in the 2-mercaptobenzimidazole.

Accordingly, subsequent purification is essential in any process for the production of 2-mercaptobenzimidazole in which the 2-mercaptobenzimidazole is formed in heterogeneous phase. Purification processes in which the crude 2-mercaptobenzimidazole is purified by repeated recrystallisation, have not proved successful on account of the already mentioned substantial insolubility in organic solvents which has already been mentioned. In most cases, the free 2-mercaptobenzimidazole is converted into a water soluble salt by treatment with alkali metal or alkaline earth metal hydroxides, the solution treated with active carbon or Tuller's earths and the 2-mercaptobenzimidazole subsequently re-precipitated by acidification. Operations of this kind involve considerable outlay for reaction vessels and filtration apparatus and, moreover, such processes can only be carried out in batches. Furthermore, these processes produce an effluent which is extremely difficult to purify.

We have now found a process for the production of highly pure 2-mercaptobenzimidazole which avoids the disadvantages referred to above, which allows the use of o-phenylene diamine containing isomers and autoxidation products and which can be continuously carried out. The invention is distinguished by the fact that the reaction of o-phenylene diamine with carbon disulphide is carried out in the presence of a known alkaline catalyst in a solvent which contains all the starting materials and also the reaction products in homogeneous solution during the reaction, the 2-mercaptobenzimidazole formed is extracted from the solution with dilute, aqueous alkali hydroxide solution, for example sodium or potassium hydroxide solution and precipitated therefrom by the addition of a mineral acid.

The solvent used in accordance with the invention must have the following properties:

(1) It must effectively dissolve the starting materials together with their impurities.
(2) It must be inert with respect to the reactants.
(3) It must effectively dissolve the substantially insoluble 2-mercaptobenzimidazole and also the impurities formed during the reaction.
(4) It must be so polar that it homogeneously dissolves the catalytic quantities of alkali hydroxide required and accelerates the reaction.
(5) It should only be very sparingly soluble in water so that it is not converted into the aqueous phase during extraction of the 2-mercaptobenzimidazole with dilute alkali hydroxide.
(6) It must be completely recoverable.

According to the invention, solvents which satisfy these requirements are benzothiazole and alkylbenzothiazoles having 1 to 4 carbon atoms in the alkyl moiety such as methylbenzothiazole, ethylbenzothiazole, propylbenzothiazole and butylbenzothiazole. Benzothiazole and methylbenzothiazole are particularly preferred.

Although the process according to the invention can be carried out in batches, it is particularly suitable for continuous working.

The process is carried out by dissolving commercial-grade o-phenylene diamine and carbon disulphide in an above mentioned solvent, in the presence of a known alkaline catalyst, heating the resulting solution, suitably separating the hydrogen sulphide formed, extracting the still warm solution with cold, dilute alkali hydroxide solution, freeing the aqueous phase from adhering solvent with a water-insoluble hydrocarbon, precipitating the 2-mercaptobenzimidazole by adding a mineral acid, for example hydrochloric acid, and freeing the solvent by distillation from the impurities which it has absorbed. The solvent can then be re-used.

The ratio of solvent to o-phenylene diamine can fluctuate within wide limits, being governed by the reaction temperature selected. In general, ratios in the range of from 10:1 to 5:1 are preferred. However, it is also possible to use large or smaller ratios.

The reaction temperatures determine the reaction velocity. Thus, a complete conversion is obtained after 15 minutes, for example in the case of reaction catalysed with 0.1% by weight of alkali hydroxide at a temperature in the range of from 120 to 140° C., and after 90 minutes of reaction catalised with 1% by weight of tripropyl amine. However, it is also possible to use lower or higher reaction temperatures. They should be in the range of from +50 to +200° C. to ensure that the reaction is carried out in complete safety. This temperature range corresponds to pressures of from 1 to 100 bars in the autoclave.

The process according to the invention is illustrated by, but by no means limited to, the following Examples.

EXAMPLE 1

151 g. of a commercial-grade o-phenylene diamine which had been obtained by the catalytic hydrogenation of o-nitraniline and which contained 2% of impurities, were distilled through a simple distillation bridge in order to separate off residues of the hydrogenation catalyst, and collected in a receiver containing 1500 g. of benzothiazole. 125 g. of carbon disulphide and 1 g. of 30% sodium hydroxide were then added and the homogeneous solution was heated to 130° C. in an autoclave. After 15 minutes, the pressure reached a constant level and the autoclave was vented. The hydrogen sulphide formed was let off and freed from unreacted carbon disulphide by washing with fresh benzothiazole. 23 g. of carbon disulphide were recovered in this way. The still hot contents of the autoclave were then introduced under pressure with vigorous stirring into 2 litres of a 2.8% aqueous sodium hydroxide solution. On completion of admixture, the phases were separated. The organic phase was distilled through a packed column, pure benzothiazole being run off overhead whilst the impurities were removed from the sump of the packed column. The aqueous phase was washed with 550 g. of o-xylene, followed by the addition of sulphuric acid until a pH of 7 was obtained. The deposit formed was separated off by filtration and dried. 229 g. of a colourless 2-mercaptobenzimidazole with a purity of 99.7% were obtained. The yield, based on the o-phenylene diamine used, amounted to 97.9% by weight, and to 99.2% by weight based on carbon disulphide. m.p.=300–303° C.

EXAMPLE 2

After heating to 80° C., a mixture of 1500 g./h. of benzothiazole, 148 g./h. of a 98% o-phenylene diamine, 125 g./h. of carbon disulphide and 1 g./h. of a 30% sodium hydroxide solution was pumped by means of a metering pump into a multiple-chamber reactor having a total capacity of 2 litres and a total of 10 chambers which was thermostatically controlled to 130° C. with a diphenyl circuit. By way of a dip pipe, the reaction mixture from the uppermost chamber was continuously relieved of pressure from 10 atms. to 1 atm. through a pressure-retaining valve. In a phase separation vessel, the hydrogen sulphide formed and the unreacted carbon disulphide were separated off from the solution. The gas stream was freed from carbon disulphide in a washing column charged with benzothiazole. The column effluent was added to the starting mixture. The solvent phase ws delivered continuously to a mixer into which flowed 2.1 litres/hour of a 2.8% sodium hydroxide solution. The overflowing mixture was continuously separated in a separation bottle into an aqueous and an organic phase. The organic phase flowed to a distillation column in which the benzothiazole was distilled off overhead, whilst the impurities were removed from the sump. The aqueous phase was freed from dissolved benzothiazole in a pulsation volumn in countercurrent with 550 g./h. of o-xylene, the xylene distilled overhead in a column and the benzothiazole running off from the sump of the column delivered to the benzothiazole recovery column. The sodium salt solution of the 2-mercaptobenzimidazole which ran off at the foot of the pulsation column had 50% sulphuric acid continuously added to it in a stirrer vessel until a pH value of 7 was obtained. The precipitated 2-mercaptobenzimidazole was filtered and dried. The product was pure white with an average purity of from 99.2 to 99.5%. The yield, based on o-phenylene diamine, amounted to more than 97% and to more than 98% based on carbon disulphide. The dried product had a melting point of 300 to 303° C.

What we claim is:

1. A process for producing high purity 2-mercaptobenzimidazole which comprises reacting o-phenylene diamine with carbon disulfide in benzothiazole or in alkylbenzothiazole having from 1 to 4 carbon atoms in the alkyl moiety, extracting resulting 2-mercaptobenzimidazole containing solution with dilute aqueous alkali metal hydroxide solution, precipitating extracted 2-mercaptobenzimidthiazole from resulting aqueous alkali metal hydroxide solution containing the same by acidification and recovering precipitated 2-mercaptobenzimidazole.

2. A process as claimed in claim 1, wherein the solvent is methylbenzothiazole.

3. A process as claimed in claim 1, wherein the ratio of the solvent to the o-phenylene diamine is within the range of from 10:1 to 5:1.

4. A process as claimed in claim 1, wherein the reaction is carried out at a temperature of from 50° C. to 200° C.

5. A process as claimed in claim 1, wherein the process is carried out continuously.

References Cited

UNITED STATES PATENTS

| | | | |
|---|---|---|---|
| 2,701,249 | 2/1955 | Koniuszy et al. | 260—309.2 |
| 2,642,396 | 6/1953 | Roddy | 260—309.2 |
| 3,235,559 | 2/1966 | Blöcher | 260—309.2 |
| 3,405,136 | 10/1968 | Wright | 260—309.2 |
| 3,558,775 | 1/1971 | Fournier | 260—309.2 |

FOREIGN PATENTS

| | | | |
|---|---|---|---|
| 1,346,552 | 11/1963 | France | 260—309.2 |

OTHER REFERENCES

Rabjohn et al., Organic Synthesis, Collective Volume IV, pages 569–70 N.Y., Wiley, 1963.

Sachs Liebig's Ann. Chemie, Vol. 365, pages 141–2 relied on (1909).

NATALIE TROUSOF, Primary Examiner